United States Patent [19]
Flora

[11] Patent Number: 5,586,071
[45] Date of Patent: Dec. 17, 1996

[54] ENHANCED FAST MULTIPLIER

[75] Inventor: Laurence P. Flora, Valley Center, Calif.

[73] Assignee: Nisys Corporation, Blue Bell, Pa.

[21] Appl. No.: 296,845

[22] Filed: Aug. 26, 1994

Related U.S. Application Data

[63] Continuation of Ser. No. 994,561, Dec. 21, 1992, abandoned, and a continuation-in-part of Ser. No. 979,548, Nov. 20, 1992, Pat. No. 5,343,417.

[51] Int. Cl.$^6$ ........................................... G06F 7/52
[52] U.S. Cl. ................................................ 364/758
[58] Field of Search ........................... 364/754, 757–760

[56] References Cited

U.S. PATENT DOCUMENTS

| | | | |
|---|---|---|---|
| 5,072,419 | 12/1991 | Zyner | 364/757 |
| 5,142,490 | 8/1992 | Tsujihashi et al. | 364/757 |
| 5,146,421 | 9/1992 | Adiletta et al. | 364/758 |

Primary Examiner—Roy N. Envall, Jr.
Assistant Examiner—Emmanuel L. Moise
Attorney, Agent, or Firm—Nathan Cass; Mark T. Starr

[57] ABSTRACT

A Wallace-type binary tree multiplier in which the partial products of a multiplicand and a multiplier are produced and then successively reduced using a plurality of adder levels comprised of full and half adders. This reduction continues until a final set of inputs is produced wherein no more than two inputs remain to be added in any column. This final set is then added using a serial adder and a carry lookahead adder to produce the desired product. The additions at each level are performed in accordance with prescribed rules to provide for fastest overall operating speed and minimum required chip area. In addition, the lengths of the serial adder and carry lookahead adder are chosen to further enhance speed while reducing required chip area. A still further enhancement in multiplier operating speed is achieved by providing connections to adders so as to take advantage of the different times of arrival of the inputs to each level along with different adder input-to-output delays.

22 Claims, 13 Drawing Sheets

```
            1 1 0 0      (12) MULTIPLICAND A
        X)  1 1 0 1      (13) MULTIPLIER B
            ─────────
            1 1 0 0
          0 0 0 0
        1 1 0 0
      1 1 0 0
      ───────────────
      1 0 0 1 1 1 0 0    (156) PRODUCT P
```

FIG. 2 (PRIOR ART)

|   |   |   |   |   |   |   | $a_7$ | $a_6$ | $a_5$ | $a_4$ | $a_3$ | $a_2$ | $a_1$ | $a_0=A$ |
|---|---|---|---|---|---|---|---|---|---|---|---|---|---|---|
|   |   |   |   |   |   | X) | $b_7$ | $b_6$ | $b_5$ | $b_4$ | $b_3$ | $b_2$ | $b_1$ | $b_0=B$ |
|   |   |   |   |   |   |   |   |   |   |   |   |   |   | $a_0b_0$ |
|   |   |   |   |   |   |   |   |   |   |   |   |   | $a_1b_0$ | $a_0b_1$ |
|   |   |   |   |   |   |   |   |   |   |   |   | $a_2b_0$ | $a_1b_1$ | $a_0b_2$ |
|   |   |   |   |   |   |   |   |   |   |   | $a_3b_0$ | $a_2b_1$ | $a_1b_2$ | $a_0b_3$ |
|   |   |   |   |   |   |   |   |   |   | $a_4b_0$ | $a_3b_1$ | $a_2b_2$ | $a_1b_3$ | $a_0b_4$ |
| PARTIAL PRODUCT ARRAY |   |   |   |   |   |   |   |   | $a_5b_0$ | $a_4b_1$ | $a_3b_2$ | $a_2b_3$ | $a_1b_4$ | $a_0b_5$ |
|   |   |   |   |   |   |   |   | $a_6b_0$ | $a_5b_1$ | $a_4b_2$ | $a_3b_3$ | $a_2b_4$ | $a_1b_5$ | $a_0b_6$ |
|   |   |   |   |   |   |   | $a_7b_0$ | $a_6b_1$ | $a_5b_2$ | $a_4b_3$ | $a_3b_4$ | $a_2b_5$ | $a_1b_6$ | $a_0b_7$ |
|   |   |   |   |   |   | $a_7b_1$ | $a_6b_2$ | $a_5b_3$ | $a_4b_4$ | $a_3b_5$ | $a_2b_6$ | $a_1b_7$ |   |   |
|   |   |   |   |   | $a_7b_2$ | $a_6b_3$ | $a_5b_4$ | $a_4b_5$ | $a_3b_6$ | $a_2b_7$ |   |   |   |   |
|   |   |   |   | $a_7b_3$ | $a_6b_4$ | $a_5b_5$ | $a_4b_6$ | $a_3b_7$ |   |   |   |   |   |   |
|   |   |   | $a_7b_4$ | $a_6b_5$ | $a_5b_6$ | $a_4b_7$ |   |   |   |   |   |   |   |   |
|   |   | $a_7b_5$ | $a_6b_6$ | $a_5b_7$ |   |   |   |   |   |   |   |   |   |   |
|   | $a_7b_6$ | $a_6b_7$ |   |   |   |   |   |   |   |   |   |   |   |   |
| $a_7b_7$ |   |   |   |   |   |   |   |   |   |   |   |   |   |   |
| $P_{15}$ $P_{14}$ | $P_{13}$ | $P_{12}$ | $P_{11}$ | $P_{10}$ | $P_9$ | $P_8$ | $P_7$ | $P_6$ | $P_5$ | $P_4$ | $P_3$ | $P_2$ | $P_1$ | $P_1=P$ |

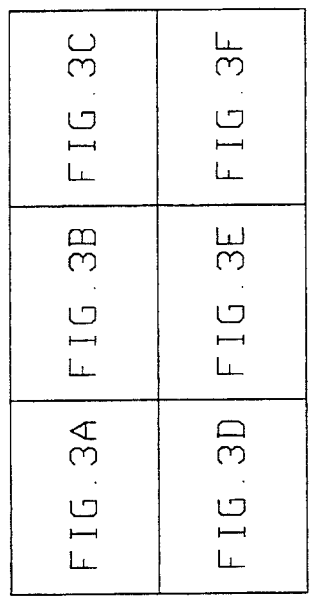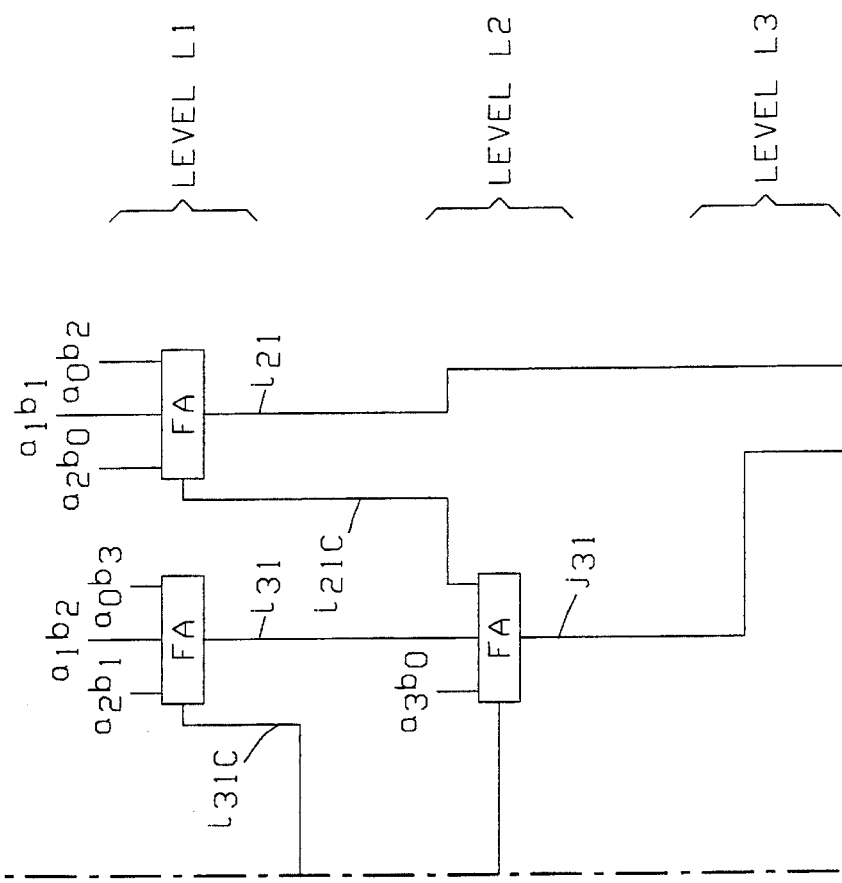

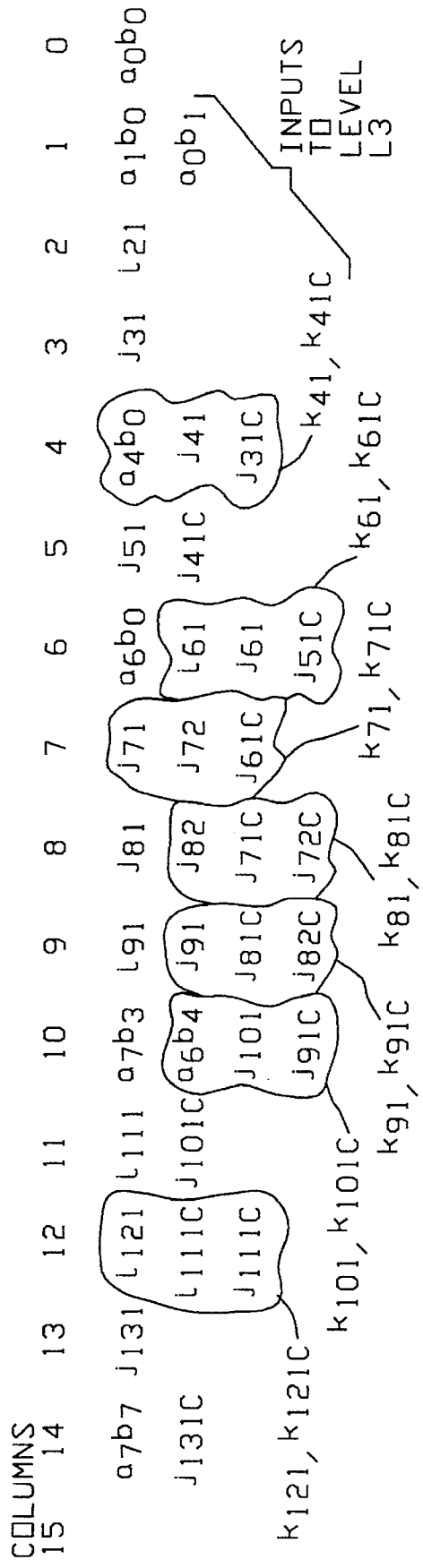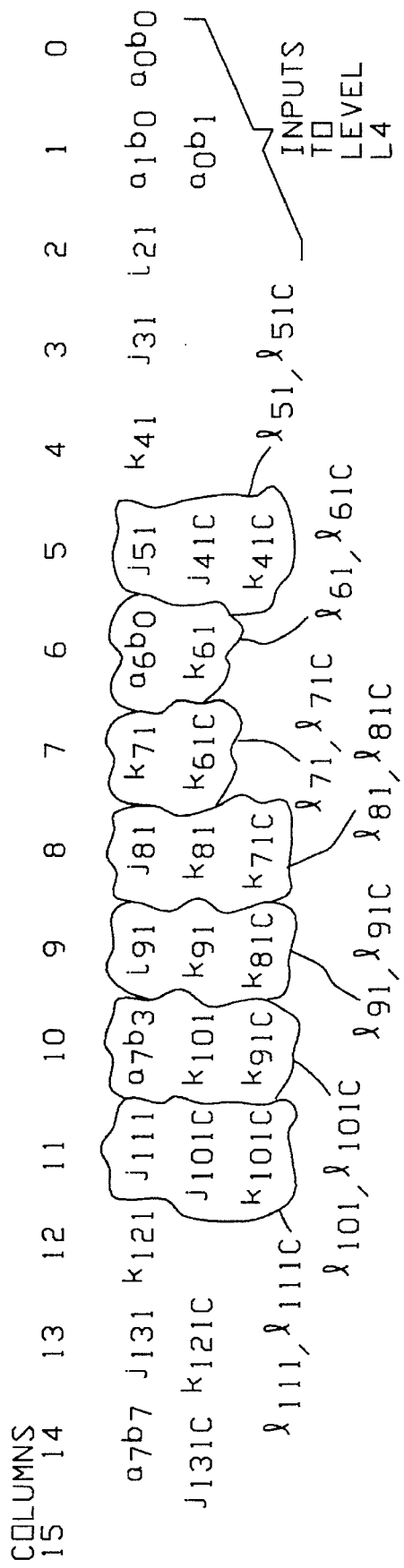
FIG. 8
FIG. 9

5,586,071

ENHANCED FAST MULTIPLIER

CROSS REFERENCE TO RELATED PATENT APPLICATIONS

This patent application is a continuation of patent application Ser. No. 07/994,561 filed Dec. 21, 1992, now abandoned, and a continuation-in-part of patent application Ser. No. 07/979,548, filed Nov. 20, 1992, now U.S. Pat. No. 5,343,417, issued Aug. 30, 1994.

BACKGROUND OF THE INVENTION

This invention relates generally to improved means and methods for performing arithmetic operations in a data processing system, and more particularly to an improved high speed binary multiplier provided on an integrated circuit chip.

In designing a high speed binary multiplier on an integrated circuit chip, two important considerations are operating speed and required chips area. Most multiplier designs attempt to make some trade-off between the two,

SUMMARY OF THE INVENTION

The primary object of the present invention is to provide improved means and methods for increasing multiplier operating speed while providing a minimum required chip area.

In a particular preferred embodiment of the invention, a Wallace-type binary tree multiplier is provided in which the partial products of a multiplicand A and a multiplier B are produced and then reduced by successive addition using a plurality of adder levels comprised of full and half adders. This reduction continues until a final set of inputs is produced having no more than two inputs remaining to be added in any column. This final set is then added using two side-by-side final adders to produce the final product. In this preferred embodiment, the particular inputs to be added by the full and half adders at each level are performed in accordance with prescribed rules to provide for fastest overall operating speed and minimum required chip area. In addition, the side-by-side final adders are chosen of prescribed type and length to take advantage of the earlier arrival times of least significant bits as compared to bits of higher significance.

A still further enhancement in multiplier operating speed is achieved by taking advantage of the different times of arrival of the inputs to each level along with the fact that delays through the adder are typically different for different adder inputs and outputs.

The specific nature of the invention as well as other objects, features, advantages and uses thereof will become evident from the following detailed description of a particular preferred embodiment taken in conjunction with the accompanying drawings.

BRIEF DESCRIPTION OF THE DRAWINGS

FIG. 2 illustrates the method of FIG. 1 applied to the multiplication of an 8-bit multiplicand by an 8-bit multiplier.

FIG. 3A to FIG. 3F is a block diagram illustrating a binary multiplier circuit in accordance with the invention.

FIGS. 6–10 schematically illustrate how the levels of FIG. 3 provide for progressively reducing the partial products in FIG. 2 to produce two final rows of inputs for application to a final adder stage.

DESCRIPTION OF A PREFERRED EMBODIMENT

Like numerals and characters refer to like elements throughout the figures of the drawings.

Figures 1, 12:
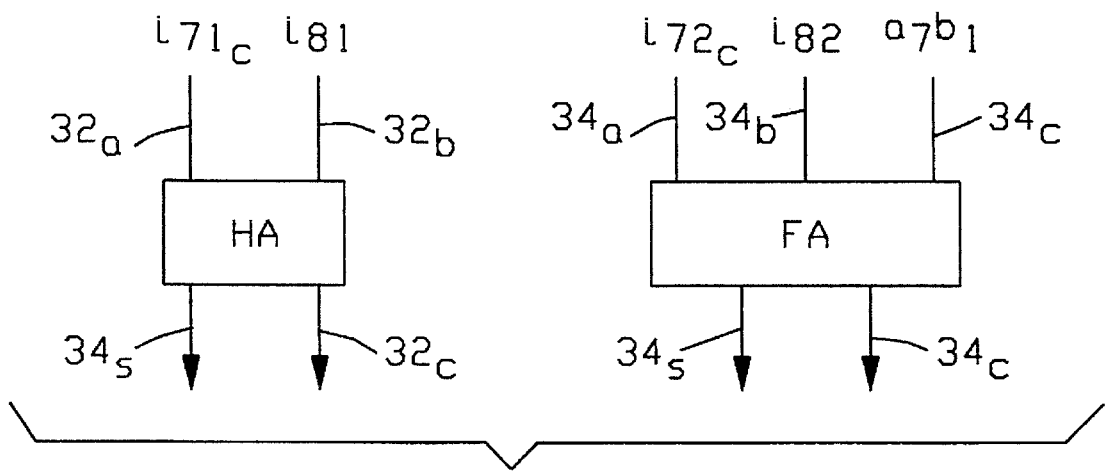
FIG. 1 illustrates the well known pencil-and-paper method of multiplication applied to binary multiplication.
FIG. 12 illustrates a modification of the connections to the adders in column 8 of level L2 for enhanced addition speed.
Figure 3A:
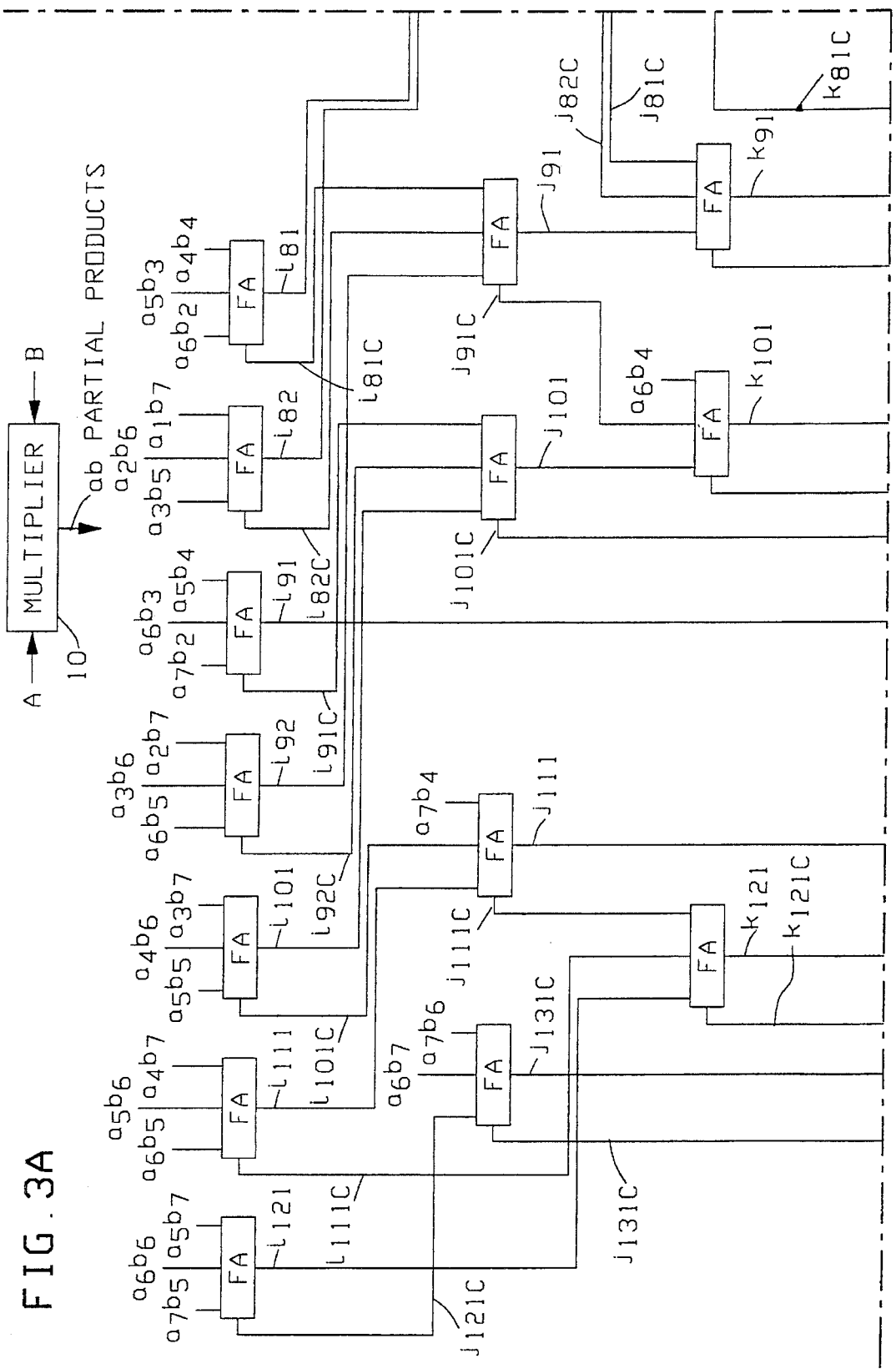
Figure 3B:
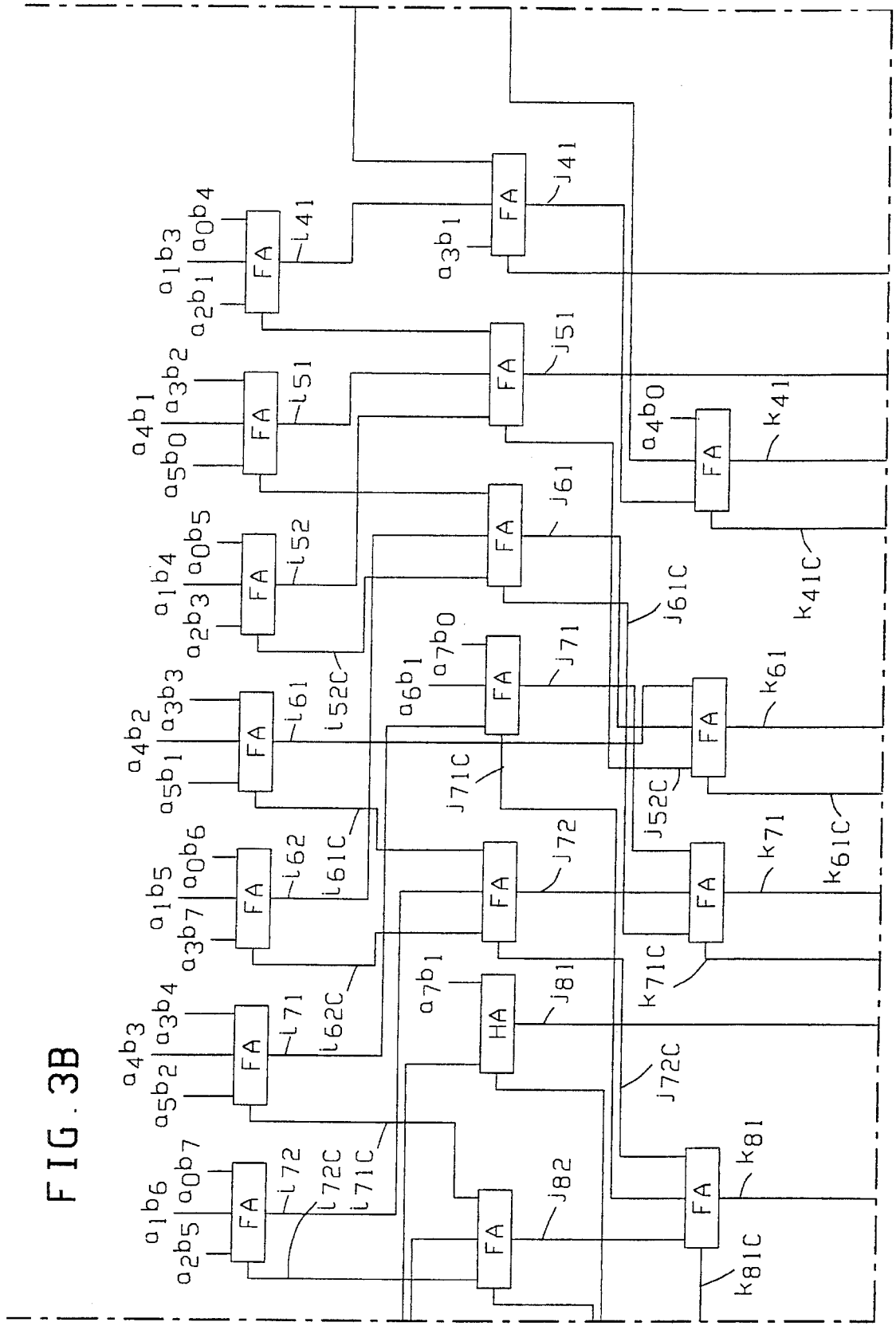
Figure 3D:
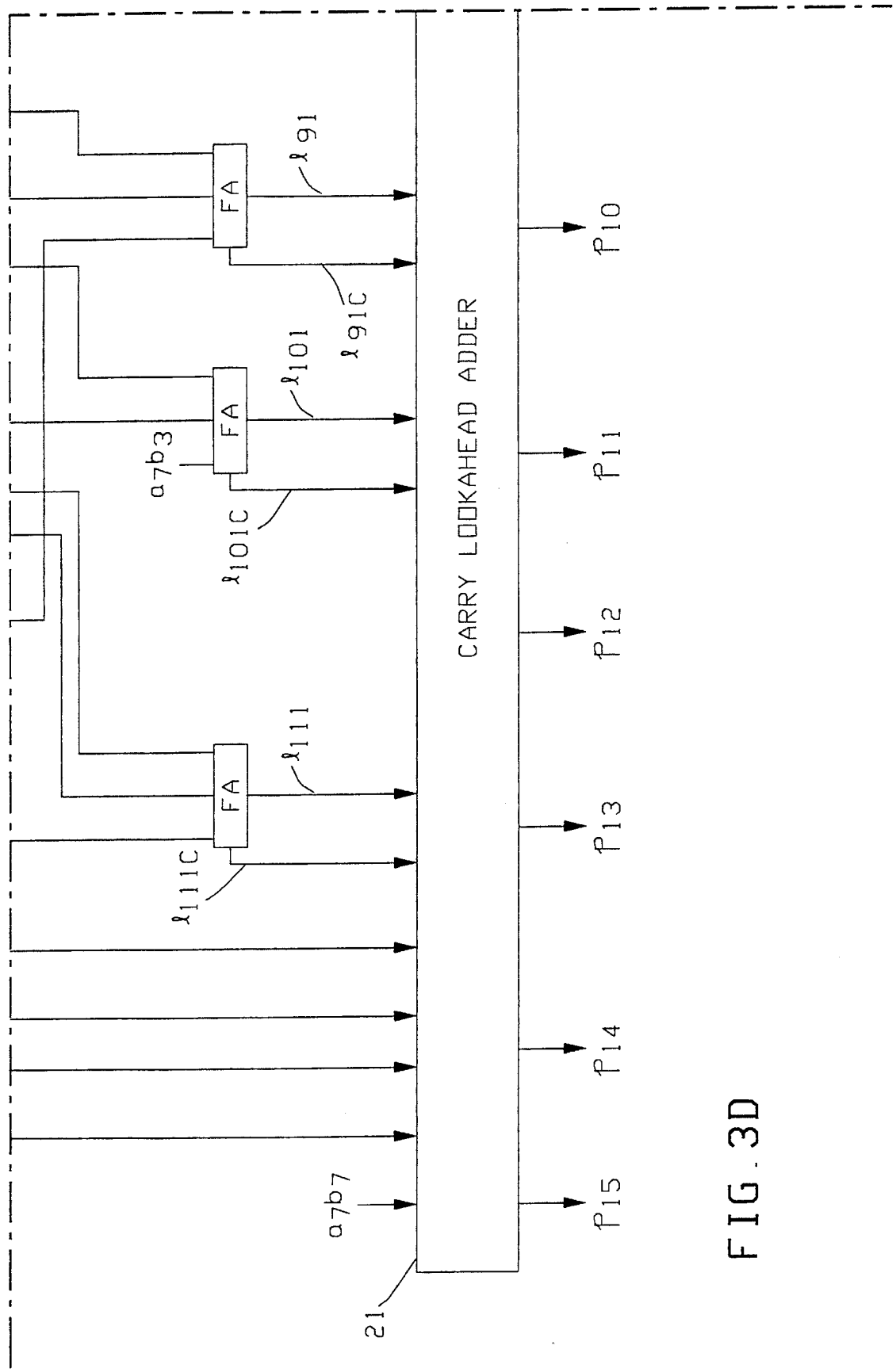
Figure 3E:
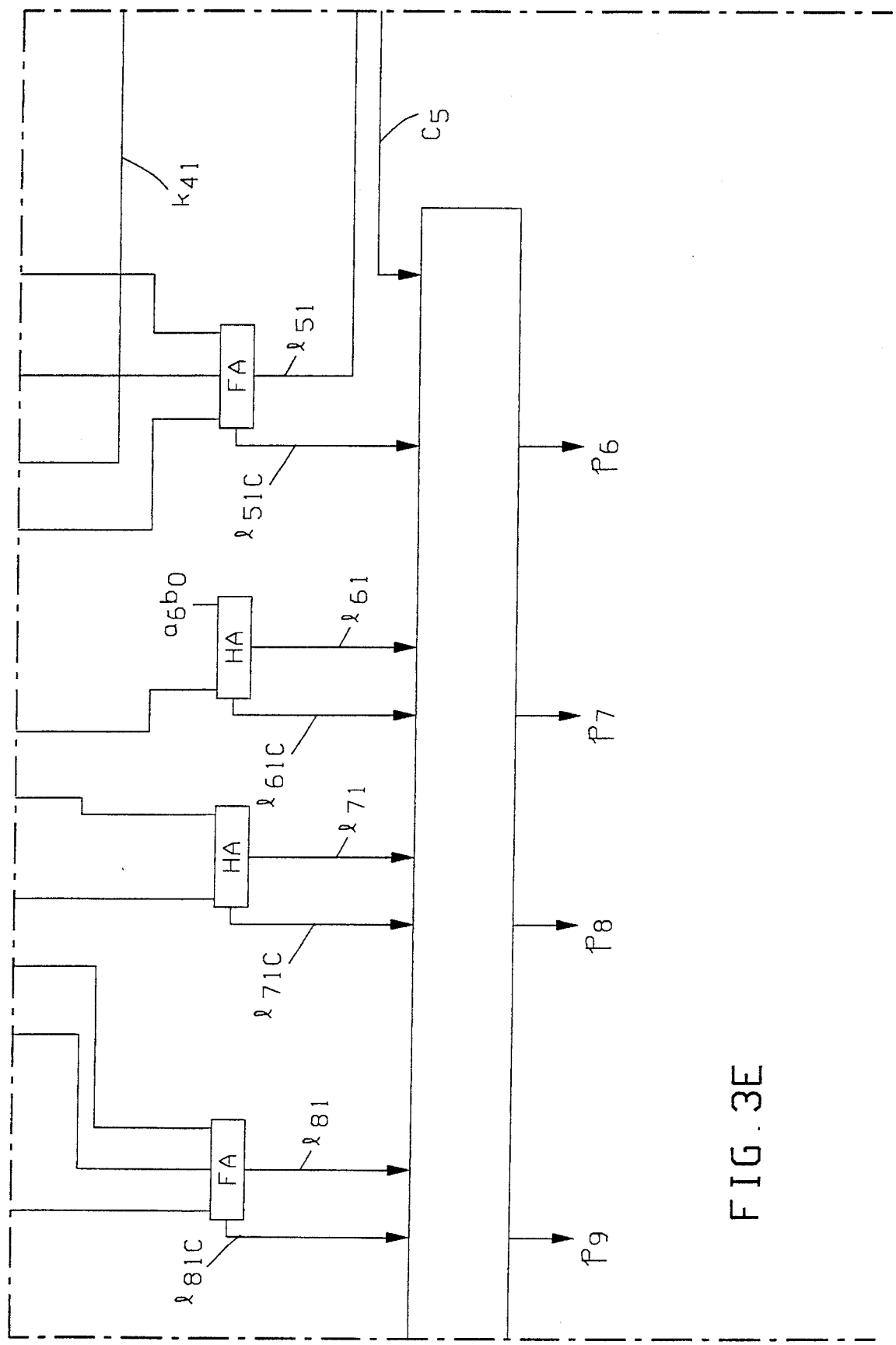
Figure 3F:
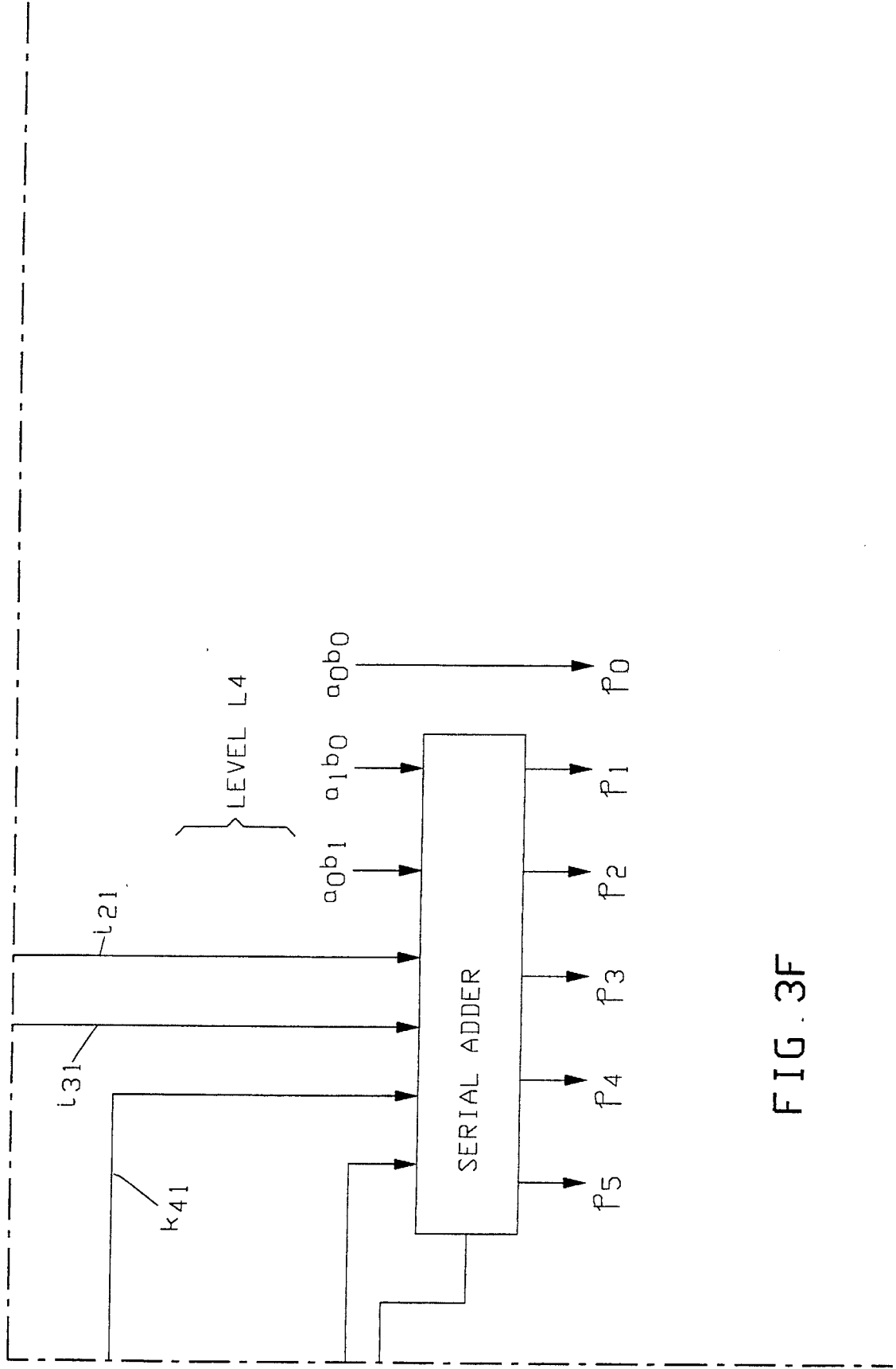

Initially, reference is directed to FIG. 1 which illustrates the well known paper-and-pencil method applied to the multiplication of a 4-bit binary multiplicand A=1100 (decimal 12) by a 4-bit binary multiplier B=1101 (decimal 13) to produce an 8-bit product P=10011100 (decimal 156).

FIG. 2 illustrates the application of the well known paper-and-pencil method of FIG. 1 applied to the multiplication of an 8-bit multiplicand $A=a_7a_6a_5a_4a_3a_2a_1a_0$ by an 8-bit multiplier $B=b_7b_6b_5b_4b_3b_2b_1b_0$ to produce a 16-bit product $P=p_{15}p_{14}p_{13}p_{12}p_{11}p_{10}p_9p_8p_7p_6p_5p_4p_3p_2p_1p_0$ obtained by adding the "ab" partial products in each column.

FIG. 3 is a preferred embodiment of a binary multiplier circuit which illustrates how the present invention may preferably be implemented for performing the multiplication exemplified in FIG. 2.

As shown in FIG. 3, the 8-bit multiplicand $A=a_7a_6a_5a_4a_3a_2a_1a_0$ and the 8-bit multiplier $B=b_7b_6b_5b_4b_3b_2b_1b_0$ are applied to an initial multiplier 10 for producing the sixty-four partial products $a_0b_0$ $a_0b_1$ - - - $a_7b_7$ shown in FIG. 2. Note that each partial product is in a respective column wherein each column corresponds to a respective product bit. These partial products are applied to a plurality of adder levels L1 to L4 comprised of full adders FA and half adders HA for successively reducing the number of column inputs applied to each level until level L4 is reached which produces a final set of column inputs wherein no more than two inputs remain to be added in any column. These remaining are then applied to side-by-side final adders 20 and 21 to produce the resulting product $P=p_{15}p_{14}p_{13}p_{12}p_{11}p_{10}p_9p_8p_7p_6p_5p_4p_3p_2p_1p_0$.

Those skilled in the art will recognize that the preferred multiplier circuit illustrated in FIG. 3 is of the general Wallace type described in "A Suggestion for a Fast Multiplier", C. S. Wallace, Vol. 13, No. 14, *IEEE Transactions on Electronic Computers* (Feb. 1964), pp. 14–17. The present invention enhances the basic Wallace approach in a manner not previously known or taught in the art in order to achieve a significantly better combination of operating speed and required chip area. The manner in which these enhancements are incorporated in the preferred embodiment of FIG. 3 will next be described.

First to be considered is the manner in which the full adders FA and half adders HA in the preferred multiplier circuit of FIG. 3 are chosen for reducing the sums output from each level. The basic rules used in FIG. 3 are as follows. For each column at each level, a full adder FA is connected to three-input groups until less than three inputs remain in the column at that level. If only two inputs remain in a column, or if the column initially has only two inputs, then an adder (preferably a half adder HA) must be used for adding these two inputs if both of the following apply: (1) the adjacent less significant column will produce a carry into this column, and (2) this two-input addition is needed to achieve a 3-to-2 reduction (rounded-down to the nearest integral ratio) of the number of inputs in this column. Any inputs not added at a level are passed on to the next level.

Figure 4:
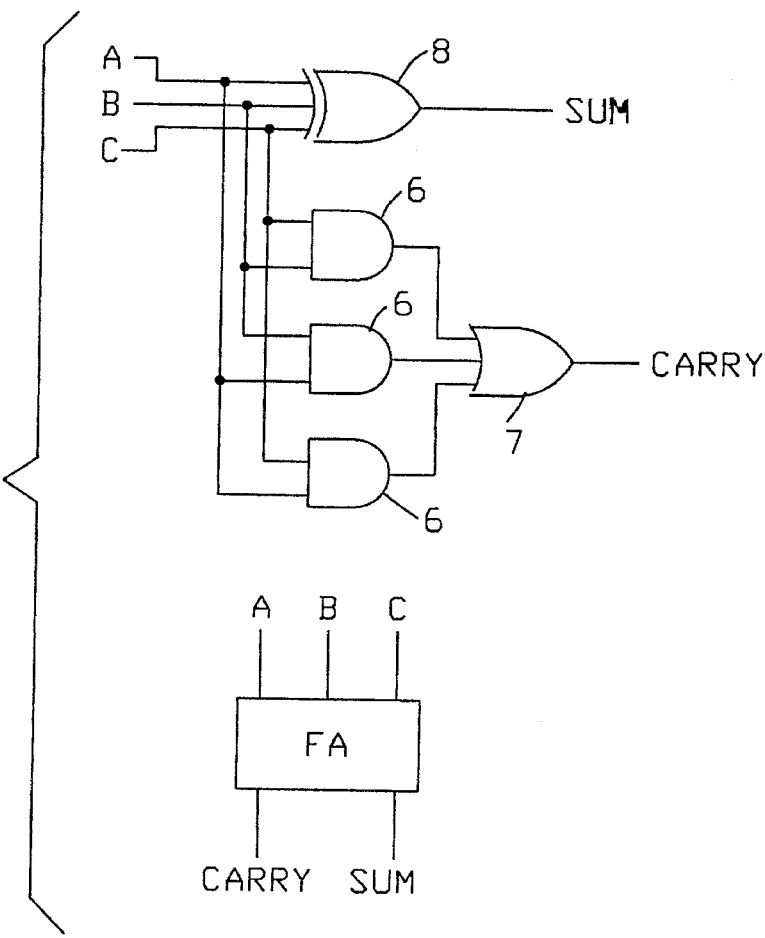
FIG. 4 is a block diagram illustrating a full adder FA which may be employed in the preferred binary multiplier circuit of FIG. 2.
Figure 5:
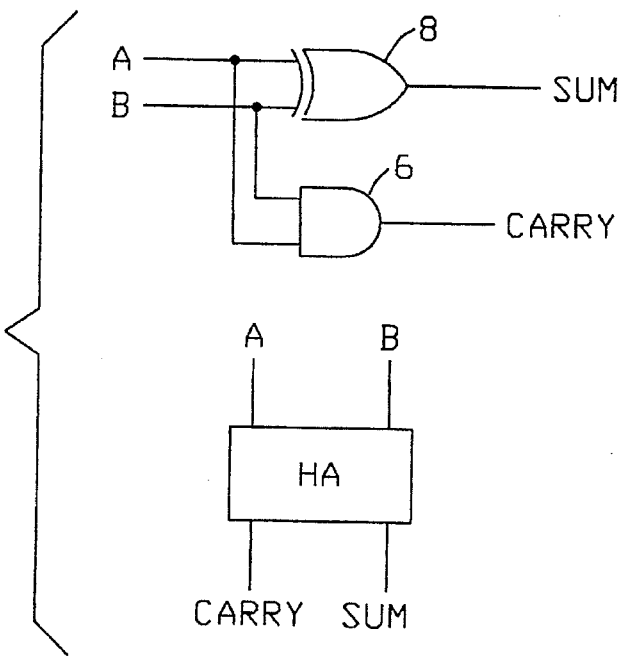
FIG. 5 is a block diagram illustrating a half adder HA which may be employed in the preferred binary multiplier circuit of FIG. 3.

Before describing how the above rule is applied in the preferred multiplier circuit of FIG. 3, attention is directed to FIGS. 4 and 5 which respectively illustrate conventional implementations for the full adders FA and half adders HA in FIG. 3. In these figures, each gate 6 performs an AND function, gate 7 performs an OR function and each gate 8 performs an exclusive OR function. Note that the full adder FA is slower than the half adder HA since it requires two gate levels compared to one for the half adder HA. Also note that the full adder FA requires significantly more chip area than does the half adder HA.

Figure 6:
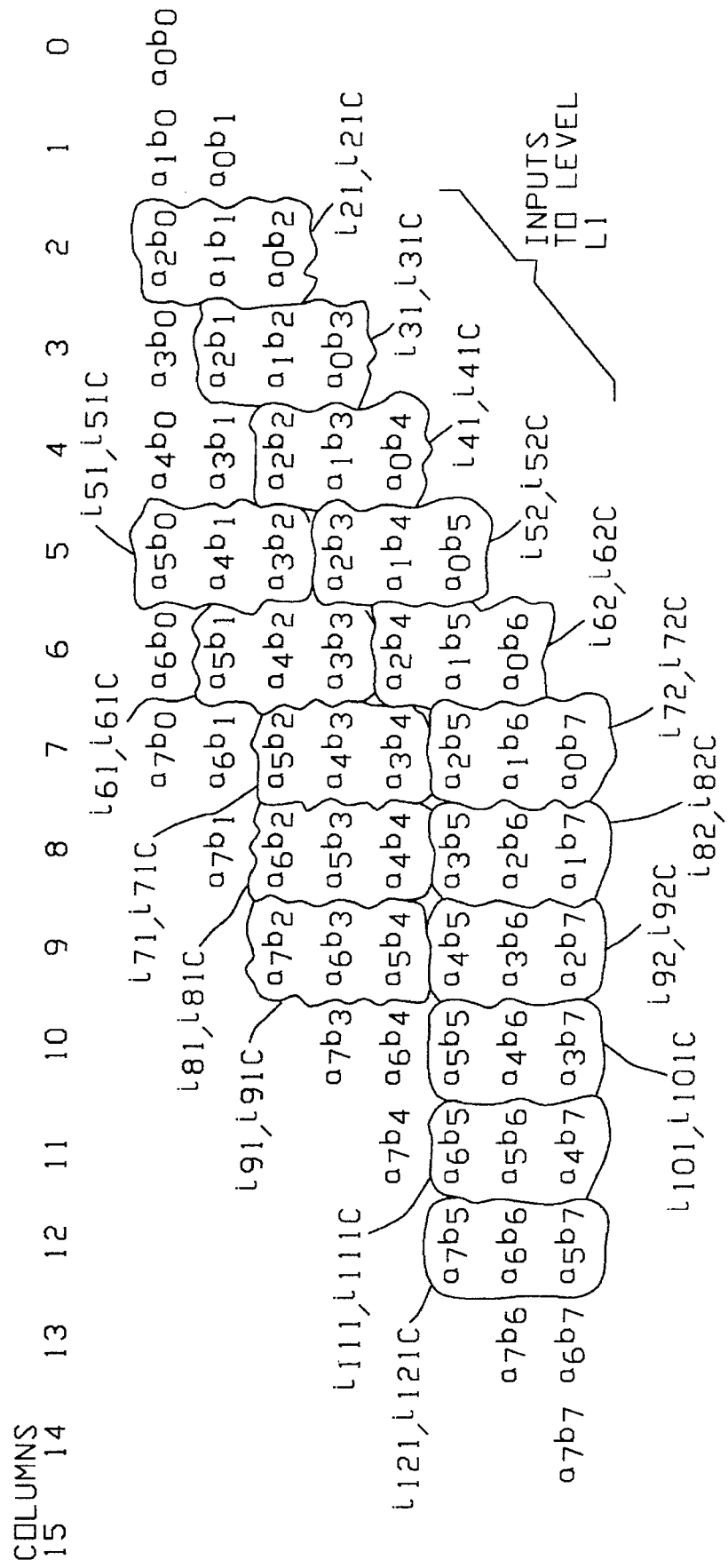

Reference is next directed to FIGS. 6–9 which schematically illustrate how the above described rules are applied at each level of the multiplier circuit of FIG. 3. FIG. 6 illustrates the inputs to level L1, which are the "ab" partial products shown in FIG. 2.

FIG. 6 also indicates which "ab" inputs to level L1 are added in each column by use of enclosing loops. If the loop encloses three inputs, a full adder FA (FIG. 4) is used, and if the loop encloses two inputs, a half adder HA (FIG. 5) is used. Each loop includes a designation of the resulting sum and carry of level L1 which are applied as inputs to the next level L2. For example, adding $a_2b_0$, $a_1b_1$ and $a_0b_2$ in column 2 results in a sum $i_{21}$ and a carry $i_{21c}$, the subscript "c" being used to identify a carry. Note that sum $i_{21}$ produces an input in the same column 2 in the next level L2, while carry $i_{21c}$ produces an input in column 3 of level L2.

FIGS. 7, 8, 9 and 10 illustrate the inputs to levels L2, L3 and L4, respectively, and are arranged similarly to FIG. 6 with loops being provided for a like purpose. Note that the inputs to level L2 shown in FIG. 7 derived from adders in level L1 use "i" designations, the inputs to level L3 shown in FIG. 8 derived from adders in level L2 use "j" designations, the inputs to level L4 shown in FIG. 9 derived from adders in level L3 use "k" designations, and the inputs to the final adders 20, 21 derived from adders in level L4 use "1" designations. The first subscript (or first two subscripts for columns greater than 9) of these i,j,k and 1 designations identify the column from which the sum or carry was derived. The second subscript is merely used to distinguish sums and carrys derived from the same column.

The manner in which the above rule is applied at each level in FIG. 3 will next be considered in detail with reference to FIGS. 6–10.

INPUTS TO LEVEL L1 (FIG. 6)

It will be seen in FIGS. 3 and 6 that each three-input group in each column of level L1 is added by a full adder FA to produce a sum and a carry. For example, in column 2 of level L1, $a_2b_0$, $a_1b_1$ and $a_0b_2$ are added by a full adder FA to produce a sum $i_2$ and a carry $i_{21c}$. The sum "$i_2$" as applied to level L2 in FIG. 7 in the same corresponding column 2, while the carry "$i_{21c}$" is applied to the next column 3 in level L2, since that is where it is added. With regard to the remaining two-input groups in the columns of level L1, the above rules do not require any of these to be added in level L1, as will now be explained.

It will be remembered that the above rules state that a two-input group in a column at a level are added if both of the following apply: (1) the adjacent less significant column will produce a carry into this column, and (2) addition is needed to achieve a 3-to-2 reduction (rounded-down to the nearest integer ratio) of the inputs in this column.

Only columns 1, 4, 7, 10, 13 in level L1 have a two-input group for which an add decision has to be made. The two inputs in column 1 meet neither requirement (1) or (2) of the rule. The remaining columns 4, 7, 10 and 13 also are not required to be added. Although they meet requirement (1), they do not meet requirement (2). This will be understood by noting that the maximum number of inputs applied to level L1 is eight (in column 7). Thus, in order to achieve a 3-to-2 reduction, the maximum number of inputs applied to level L2 in any column must be six or less (since an 8-to-6 reduction meets the 3-to-2 reduction requirement). The fact that addition of none of the two-input groups in level L1 are required to meet the rules will become evident by noting that all of the columns in level L2 in FIG. 7 have six or less inputs even though none of the two-input groups are added in level L1.

INPUT TO LEVEL L2 (FIG. 7)

Figure 7:
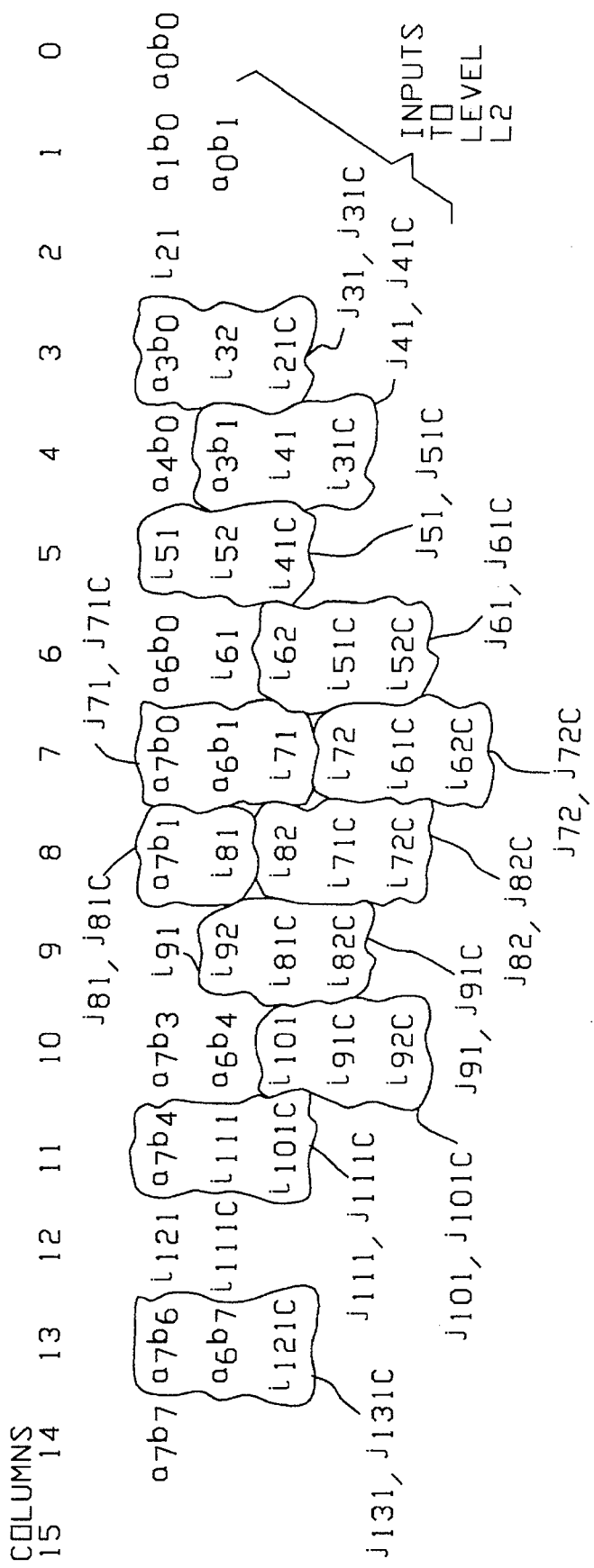

In level L2 in FIG. 7, only columns 1, 6, 8, 10 and 12 require decisions to be made with regard to adding a two-input group. Column 1 need not be added since it does not meet either requirement (1) or (2) of the rules. The two-input groups in columns 1, 6, 10 and 12 need not be added. This will be evident from FIG. 8 which shows that, even though these two-input groups are not added, none of the effected columns in level L3 (FIG. 8).will have inputs which exceed the maximum of 4 dictated by the required 3-to-2 reduction (6-to-4) for level L2. However, the rule requires adding of the two-input group $a_7b_1$, $i_{81}$ in column 8 of level L2 (FIG. 7), since seven inputs would otherwise result in column 8 of level L3 (FIG. 8), exceeding the maximum of 4. By adding $a_7b_1$, $i_{81}$, the column 8 inputs to level L3 are held to the maximum of 4.

LEVEL L3 (FIG. 8).

In level L3, decisions with respect to adding two-input groups need only be made for columns 1, 5, 11 and 14. Columns 1 and 14 need not be added since they do not meet either requirement (1) or (2) of the rules. The two-input groups in columns 5, 11 and 14 also need not be added. Although they meet requirement (1), they do not meet requirement (2). This will be understood by noting that the required 3-to-2 reduction ratio (rounded-down to the nearest integer) is met for level L3 by providing a 4-to-3 reduction (the nearest rounded-down integer ratio). This reduction is met for these columns since, even though these two input groups are not added, none of the effected columns in level L4 (FIG. 9) have inputs which exceed the maximum of 4 dictated by the required 4-to-3 reduction for level L3.

INPUTS TO LEVEL L4 (FIG. 9)

In level L4, adding decisions need to be made only for columns 1, 6, 7, 13 and 14. Columns 1, 13 and 14 need not be added, since neither requirement (1) nor (2) of the rule is met for these columns. However, the two-input groups in columns 6 and 7 need to be added in order to meet the 3-to-2 reduction requirement for level L4, otherwise three inputs would be applied to the effected columns of final adders 20 and 21, rather than the no more than two inputs per column applied to these adders 21 and 22 shown in FIG. 10.

It has thus been explained how additions of inputs are performed at each level of the preferred multiplier circuit in accordance with the prescribed rules. Although the preferred multiplier circuit of FIG. 3 performs only those two-input additions required by the rules, it is within the scope of the present invention to allow addition of a remaining two-input group in a column even though not required by the rules. For example, this may be done for routing Convenience. Such instances should be limited to prevent exceeding a desired predetermined maximum chip area.

Figure 10:
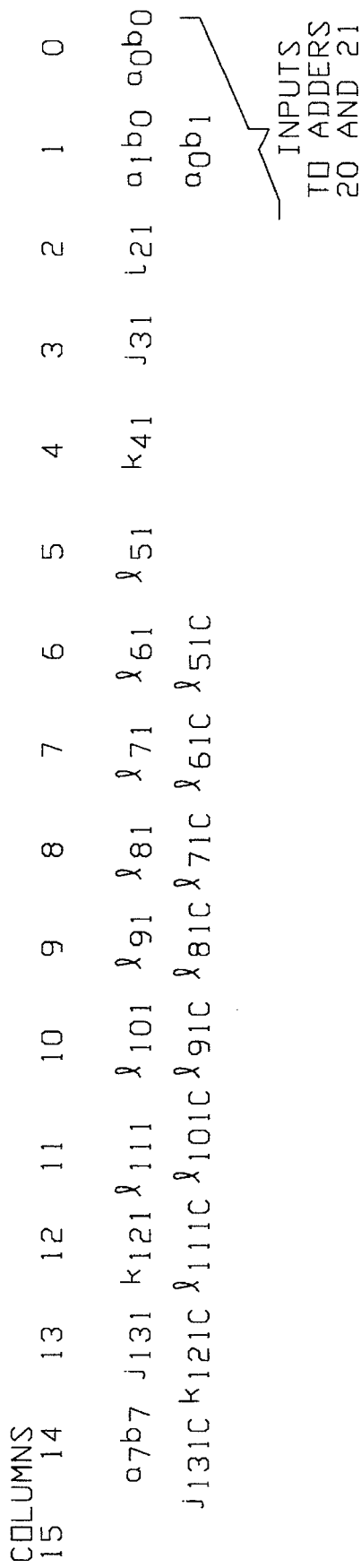

The remaining parts of the preferred multiplier circuit of FIG. 3 to be considered are the final adders 21 and 22, which receive the two rows of inputs shown in FIG. 10. Note that the least significant product bit $P_0$ is obtained directly from the partial product $a_0b_0$ in column "o" and need not be included in the final addition.

Figure 11:
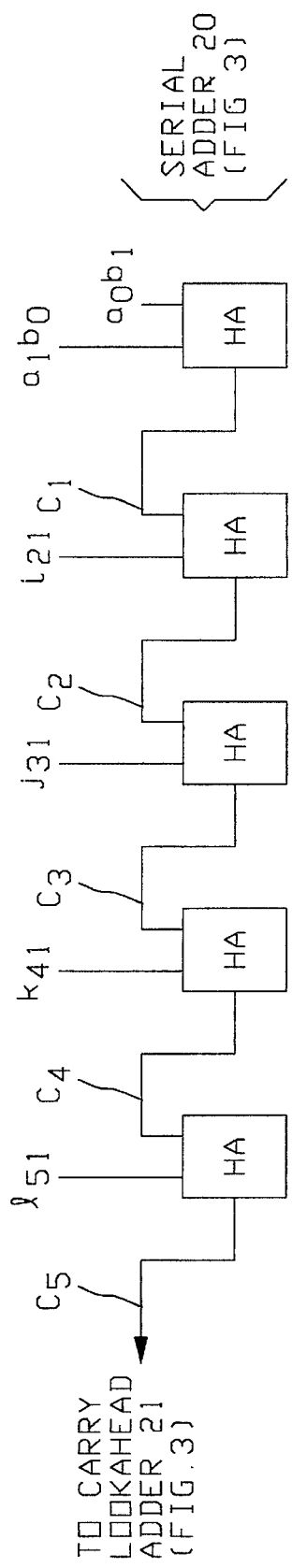
FIG. 11 illustrates a preferred embodiment of the serial adder 20 in FIG. 3.

Adder 21, receives the inputs from column 1–5 (FIG. 10) and is chosen to be simply a conventional serial adder (without lookahead), such as illustrated in FIG. 11. Adder 22 is chosen to be a conventional carry lookahead adder, which receives the output carry $C_5$ from serial adder 21 and also the inputs from columns 6–15 (FIG. 10). This choice of length for the serial adder 21 in the preferred multiplier circuit of FIG. 3 is approximately ⅓ of the total number of columns required to be added in this final adder-stage, which has been found to be a preferred length for a Wallace-type multiplier. This choice of the two adders 21 and 22 takes advantage of signal flow through levels L1–L4 of the multiplier circuit of FIG. 3 which causes more significant inputs in FIG. 10 to arrive progressively later than less significant inputs. The number of stages provided for the serial adder 20 (FIG. 11) is chosen so that its output carry $C_5$ (FIG. 3) arrives no later than the arrival of the column 6 inputs applied to the carry lookahead adder 21. It is most advantageous that the number of stages for the serial adder 20 be chosen so that its output carry $c_5$ arrives at approximately the same time as the arrival of the column 6 inputs. Note that the serial adder 20 shown in FIG. 11 advantageously employs half adders, thereby permitting faster generation of the output carry $C_5$.

The above choice of the adders 20 and 21 in FIG. 2, as described above, provides a further significant enhancement in multiplier performance. The serial adder 20, because of its simplicity, requires relatively less chip area; yet, its slower addition does not detract from overall adder speed, since its length is advantageously chosen so that its output carry $C_5$ is produced at approximately the same time as the arrival of the column 6 inputs applied to the carry lookahead adder 21. Also, because the use of the serial adder 20 permits a smaller carry lookahead adder 21 to be used, it will be faster and require less chip area. As is well known, the propagation delay of a conventional carry lookahead adder increases progressively as the number of bit positions it is required to handle increases.

A further enhancement in the operating speed of the multiplier circuit of FIG. 3 is provided in accordance with the invention by taking advantage of the different arrival times of the inputs to each level and the fact that input-to-output delays through the adders may be different for different adders as well as being different for different inputs of the same adder. The present invention takes advantage of these differences to provide additional control for achieving a desired balance of multiplier speed and required chip area without having to change the number and type of adders provided in accordance with the previously described rules.

An example of how this approach may be implemented in the preferred embodiment of FIG. 3 will next be presented.

Assume that it is desired to enhance the speed of reduction for a particular column of the multiplier circuit of FIG. 3. In a preferred implementation, the following rules are used for applying inputs and adders for this particular column at each adder level:

(1) If one or more inputs in this particular column are not to be added, select the slowest arriving inputs as these not to be added inputs and apply them to the next level without addition.

(2) If there is a half adder in this particular column, then apply the next slowest arriving input to a first input of the half adder which provides the smallest delay to the adder sum output. Apply to the second half adder input one of the remaining arriving inputs in this particular column chosen such that the resulting half adder sum output is caused to arrive due to this input no later than that due to the input applied to the first half adder input. Preferably, the arriving input applied to this second half adder input is chosen so that the resulting half adder sum arrival due to this input most closely approximates that due to the input applied to the first half adder input.

(3) Apply the remaining next slowest arriving input to a first input of a full adder which provides the shortest delay to the full adder sum output. Apply to the second and third full adder inputs particular ones of the remaining arriving inputs such that to the extent possible, the resulting full adder sum output is caused to arrive due to each of these inputs no later than due to the input applied to the first full adder input. Preferably, the inputs applied to these second and third full adder inputs are chosen so that the resulting full adder sum output arrival due to each approximates that due to the input applied to the first full adder input.

(4) Repeat (3) above for each of the remaining full adders in this particular column.

Alternatively, the above rule (3) can be modified to begin with the fastest arriving signal. In such case, rule (3) would be replaced by the alternate rule (3)':

(3)' Apply the fastest arriving input in this particular column to a first input of a full adder which provides the longest delay to the adder sum output. Apply to the second and third full adder inputs particular ones of the remaining arriving inputs such that to the extent possible, the resulting full adder sum output arrival due to each of these inputs is no sooner than due to the input applied to the first full adder input. Preferably, the inputs applied to the second and third full adder inputs are chosen so that the resulting full adder sum output arrival due to each approximates that due to the input applied to the first full adder input.

Next to be described is an example which demonstrates how the above rules (1), (2), (3) and (4) may be applied to the multiplier circuit of FIG. 3. It will be understood that input-to-output adder delays can be determined from information provided by the manufacture or by testing. Arrival times of inputs at each level can be determined from calculations, simulations or testing. For this example, it will be illustrated how the speed of addition may be enhanced for column 8 of level L2 (FIG. 7) which contains the five inputs $a_7b_1$, $i_{81}$, $i_{82}$, $i_{71c}$ and $i_{72c}$.

Initially, note in FIG. 7 that the first described rules applied to column 8 of level L2 resulted in applying three of the five inputs ($i_{82}$, $i_{71c}$ and $i_{72c}$) to a full adder and the remaining two input ($a_7b_1$ and $i_{81}$) to a half adder. However, this application of the inputs to the adders did not take into account the arriving times of the inputs or the different input-to-output delays provided by the adders. When this is done in accordance with the second described rules above, the column 8, level L2 inputs are applied to the adders in a different manner, as illustrated in FIG. 12, wherein the half adder is labeled 32 and the full adder is labeled 34. The half adder inputs are labeled 32a and 32b and the half adder sum and carry outputs are labeled 32s and 32c respectively. The full adder inputs are labeled 34a, 34b and 34c and the full adder sum and carry outputs are labeled 34s and 34c respectively.

The manner in which the illustrated FIG. 12 connections are provided in accordance with the second described rules is set forth below:

Rule (1)

Since there are no inputs in column 8 of level L2 which are not to be added, this rule is skipped.

Rule (2)

Since a half adder 32 (FIG. 12) is provided in column 8 of level L2, rule (2) requires that the slowest arriving input be applied to the fastest half adder input, which will be assumed to be 32a. The slowest arriving inputs in column 8 of level L2 are likely to be inputs $i_{71c}$ and $i_{72c}$. The reason is that these inputs $i_{71c}$ and $i_{72c}$ are derived from slower arriving carry adder outputs from level L1. Also, since the "ab" inputs to level L1 typically arrive at approximately the same time from multiplier 10 in FIG. 3, $i_{71c}$ or $i_{72c}$ can be expected to arrive at approximately the same time; thus, either may be chosen as the slowest arriving input in column 8 of level L2. For this example, $i_{71c}$ is selected to be applied to the fastest half adder input 32a, as shown in FIG. 12. Also in accordance with rule (2), input $i_{81}$ in column 8 of level L2 is applied to the other half adder input 32b since it is assumed for this example that it produces a half adder sum arrival which most closely approximates that due to $i_{71c}$ applied to half adder input 32a.

Rule (3)

The remaining three inputs in column 8 at level L2 are $a_7b_1$, $i_{82}$ and $i_{72c}$ which are applied to the full adder 34 in FIG. 12. For this example, it is assumed that 34a is the fastest full adder input, that 34b is the next fastest full adder input, and that 34c is the slowest full adder input. In accordance with rule (3), the next slowest input in column 8 of level L2 is applied to the fastest full adder input 34a. This next slowest signal is input $i_{72c}$ (since it is a carry derived from level L1 as explained above), and thus is applied to the fastest full adder input 34a. The next slowest arriving signal in column 8 of level L2 is obviously $i_{82}$, since the other remaining input $a_7b_1$ arrives much sooner as a result of having passed directly through level L1 without addition. Thus, as shown in FIG. 12, $i_{82}$ is applied to full adder input 34b, while $a_7b_1$ is applied to the slowest full adder input 34c.

Although the above example has been limited to demonstrating how the addition speed of the inputs in column 8 of level L1 may be enhanced, it is to be understood that other levels of column 8 as well as other columns of the multiplier circuit of FIG. 3 could have their speed enhanced in a like manner. It is also to be understood that, typically, only particular columns are speed sensitive so that this speed enhancement approach may be used in a multiplier selectively for one or more particular columns.

It is further to be understood that since a speed sensitive column typically contains one or more inputs derived from the adjacent less significant column, the speed of addition for a speed-sensitive column may be further enhanced by choosing connections in this adjacent less significant column to take advantage of arrival times and adder delays so that carry inputs in the adjacent speed sensitive column are produced faster.

From a global viewpoint, still further speed enhancements are possible by taking into account how input adder connections for all columns for a plurality of levels affect overall multiplier speed, and then taking advantage of arrival times and adder delays such that the fastest overall multiplier speed is obtained.

Although the present invention has been described with respect to particular preferred embodiments, it is to be understood that the present invention is not limited to the preferred embodiments, since many variations in construction arrangement, use and operation are possible within the scope of the invention. For example, the invention can readily be adapted for use when the original multiplier and multiplicand are represented in two's complement binary encoded format. Also, the invention may be adapted for use with other types of multipliers, such as a Booth multiplier.

Accordingly, the present invention is to be considered as encompassing all modifications, variations and adaptations coming within the scope of the invention as defined by the appended claims.

What is claimed is:

1. In an electronically implemented method for multiplying an n-bit multiplicand by an m-bit multiplier to produce a multiple-bit product, the steps comprising:

forming m+n partial product signals by multiplying a signal representing each bit of said multiplier by a signal representing each bit of said multiplicand, each partial product signal being in a respective column and each column corresponding to a respective product bit;

applying the partial product signals as inputs to a multiple level adder comprised of a plurality of adder levels for successively reducing the number of column inputs until a final set of column inputs are produced having no more than two inputs remaining to be added in any column, said adder levels comprising adders providing different adder delays between adder inputs and outputs; and adding inputs applied to the levels of said multiple level adder using differences in arrival times of inputs to adder levels in conjunction with said different adder delays to increase the speed of addition in at least one column.

2. The method of claim 1, wherein a particular column at a particular level has at least one full adder and also has a half adder, wherein each half adder has two inputs and an adder sum output and each full adder has three inputs and an adder sum output, each of said adders having different input-to-output delays, and wherein said adding is performed for said particular column at said particular level in accordance with the following rules:

a) if one or more inputs in said particular column are not to be added at said particular level, select the slowest arriving inputs as these not to be added inputs and apply them to the next level without addition;

b) if there is a half adder in said particular column at said particular level, apply the next slowest arriving input to a first half adder input which provides the smallest delay to the adder sum output, and apply to a second half adder input a remaining arriving input chosen such that the resulting half adder sum output is caused to arrive due to this remaining input no later than due to the input applied to said first half adder input;

c) apply the remaining next slowest arriving input to a first full adder input which provides the shortest delay to the full adder sum output, and apply to second and third full adder inputs particular ones of the remaining arriving inputs such that to the extent possible the resulting full adder sum output is caused to arrive due to each of these inputs no later than due to the input applied to said first full adder input; and d) repeat c) above for each remaining full adder in said particular column at said particular level.

3. The method of claim 1, wherein a particular column at a particular level has at least one full adder and also has a half adder, wherein said half adder has two inputs and an adder sum output and said full adder has three inputs and an adder sum output, each of said adders having different input delays, and wherein said adding is performed for said particular column at said particular level in accordance with the following rules:

a) if one or more inputs in said particular column are not to be added at said particular level, select the slowest arriving inputs as these not to be added inputs and apply them to the next level without addition;

b) if there is a half adder in said particular column at said particular level, apply the next slowest arriving input to a first half adder input which provides the smallest delay to the adder sum output, and apply to a second half adder input a remaining arriving input chosen such that the resulting half adder sum output is caused to arrive due to this remaining input no later than due to the input applied to said first half adder input;

c) apply the fastest arriving input to a first full adder input which provides the longest delay to the full adder sum output, and apply to second and third full adder inputs particular ones of the remaining arriving inputs such that to the extent possible the resulting full adder sum output arrival due to each of these inputs is no sooner than due to the input applied to the first full adder input;

d) repeat c) above for each remaining full adder in said particular column at said particular level.

4. The method of claim 2 or 3, wherein to the extent possible second and third adder inputs are connected to adders such that the resulting arrival times of the respective adder sum outputs are approximately equal to the arrival time of the adder sum output due to the input applied to the first adder input.

5. The method of claim 2 or 3, wherein each adder also has a carry sum output, wherein said particular column includes a particular arriving-input derived from an adder carry output produced from addition in the adjacent less significant column at the previous level, and wherein connections are provided to adder inputs in said adjacent less significant column at said previous level so as to speed up the arrival of said particular arriving input.

6. In an electronically implemented method for multiplying an n-bit multiplicand by an m-bit multiplier to produce a multiple-bit product, the steps comprising:

forming m+n partial product signals by multiplying a signal representing each bit of said multiplier by a signal representing each bit of said multiplicand, each partial product signal being in a respective column and each column corresponding to a respective product bit;

applying the partial product signals as inputs to a multiple level adder comprised of a plurality of adder levels, said adder levels comprising adders providing different adder delays between adder inputs and outputs, and wherein a particular column at a particular level has at least one full adder and also has a half adder, wherein said half adder has two inputs and an adder sum output and said full adder has three inputs and an adder sum output; and adding the partial product signals in each column using said plurality of adder levels for successively reducing the number of column inputs until a final set of column inputs are produced having no more than two inputs remaining to be added in any column;

said adding being performed in accordance with the following rules:

a) for each column at each level, three-input groups are added using a full adder until less than three inputs remain in the column at that level;

b) if only two inputs remain in a column after performing a) or if the column originally has only two inputs, then these two inputs are added using a half adder when both of the following apply:
(1) the adjacent less significant column will produce a carry into this column, and
(2) this two-input addition is needed to a achieve a 3-to-2 reduction rounded-down to the nearest integral ratio for that level; said adding being performed for a particular column at a particular level in accordance with the following additional rules:

c) if one or more inputs in said particular column are not to be added at said particular level, select the slowest arriving inputs as these not to be added inputs and apply them to the next level without addition;

d) if there is a half adder in said particular column at said particular level, apply the next slowest arriving input to a first half adder input which provides the smallest delay to the adder sum output, and apply to a second half adder input a remaining arriving input chosen such that the resulting half adder sum output is caused to arrive due to this remaining input no later than due to the input applied to said first half adder input;

e) apply the remaining next slowest arriving input to a first full adder input which provides the shortest delay to the full adder sum output, and apply to second and third full adder inputs particular ones of the remaining arriving inputs such that to the extent possible the resulting full adder sum output is caused to arrive due to each of these inputs no later than due to the input applied to said first full adder input; and f) repeat c) above for each remaining full adder in said particular column at said particular level.

7. The method of claim 6, wherein inputs in a first predetermined number of columns of said final set are added in a serial adder and inputs in a second predetermined number of columns of said final set are added in a carry lookahead adder.

8. The method of claim 7, wherein said first predetermined number of columns are of less significance than said second predetermined number of columns, and wherein said serial adder produces an output carry which is applied as an input to said carry lookahead adder.

9. The method of claim 8, wherein said first predetermined number of columns is chosen to be approximately one-third of the total number of columns of said final set of inputs.

10. The method of claim 8, wherein said first predetermined number of columns is chosen so that said output carry arrives at said carry lookahead adder no later than the arrival of the inputs in the least significant column applied to said lookahead adder.

11. In a binary multiplier circuit for multiplying an n-bit multiplicand by an m-bit multiplier to produce a multiple-bit product, a combination comprising:

an initial binary multiplier to which signals representing the bits of said multiplier and multiplicand are applied for producing m+n partial product signals, each partial product signal being in a respective column and each column corresponding to a respective product bit; and adder circuit means to which said partial product signals are applied, said adder circuit means comprising a plurality of adder levels for successively reducing the number of inputs in each column, said adder levels comprising adders providing different adder delays between adder inputs and outputs, and wherein each level has at least one full adder and also has a half adder, wherein each half adder has two inputs and an adder sum output and each full adder has three inputs and an adder sum output;

wherein arriving inputs are applied to each adder level in using differences in arrival times of the inputs to the adder levels in conjunction with said different adder delays to increase the speed of addition in at least one column.

12. The combination of claim 11, wherein said adder circuit means performs addition for a particular column at a particular level in accordance with the following rules:

a) if one or more inputs in said particular column are not to be added at said particular level, select the slowest arriving inputs as these not to be added inputs and apply them to the next level without addition;

b) if there is a half adder in said particular column at said particular level, apply the next slowest arriving input to a first half adder input which provides the smallest delay to the adder sum output, and apply to a second half adder input a remaining arriving input chosen such that the resulting half adder sum output is caused to arrive due to this remaining input no later than due to the input applied to said first half adder input;

c) apply the remaining next slowest arriving input to a first full adder input which provides the shortest delay to the full adder sum output, and apply to second and third full adder inputs particular ones of the remaining arriving inputs such that to the extent possible the resulting full adder sum output is caused to arrive due to each of these inputs no later than due to the input applied to said first full adder input; and d) repeat c) above for each remaining adder in said particular column at said particular level.

13. The combination of claim 11, wherein said adder circuit means performs addition for a particular column at a particular level in accordance with the following rules:

a) if one or more inputs in said particular column are not to be added at said particular level, select the slowest arriving inputs as these not to be added inputs and apply them to the next level without addition;

b) if there is a half adder in said particular column at said particular level, apply the next slowest arriving input to a first half adder input which provides the smallest delay to the adder sum output, and apply to a second half adder input a remaining arriving input chosen such that the resulting half adder sum output is caused to arrive due to this remaining input no later than due to the input applied to said first half adder input;

c) apply the fastest arriving input to a first full adder input which provides the longest delay to the full adder sum output, and apply to second and third full adder inputs particular ones of the remaining arriving inputs such that to the extent possible the resulting full adder sum output arrival due to each of these inputs is no sooner than due to the input applied to the first full adder input;

d) repeat c) above for each remaining adder in said particular column at said particular level.

14. In a binary multiplier circuit for multiplying an n-bit multiplicand by an m-bit multiplier to produce a multiple-bit product, a combination comprising:

an initial binary multiplier to which signals representing the bits of said multiplier and multiplicand are applied for producing m+n partial product signals, each partial product signal being in a respective column and each column corresponding to a respective product bit; and adder circuit means to which said partial product signals are applied, said adder circuit means comprising a plurality of adder levels for successively reducing the number of column inputs until a final set of inputs are produced having no more than two inputs remaining to be added in any column, said adder levels comprising adders providing different adder delays between adder inputs and outputs;

said adder circuit means performing addition at each level in accordance with the following rules:

a) for each column at each level, three-input groups are added until less than three inputs remain in the column at that level;

b) if only two inputs remain in a column after performing a) or if the column originally has only two inputs, then these two inputs must be added when both of the following apply:

(1) the adjacent less significant column will produce a carry into this column, and (2) this two-input addition is needed to a achieve a 3-to-2 reduction rounded-down to the nearest integral ratio for that level, wherein arriving inputs are connected for a particular column at a particular level in accordance with the following additional rules:

c) if one or more inputs in said particular column are not to be added at said particular level, select the slowest arriving inputs as these not to be added inputs and apply them to the next level without addition;

d) if there is a half adder in said particular column at said particular level, apply the next slowest arriving input to a first half adder input which provides the smallest delay to the adder sum output, and apply to a second half adder input a remaining arriving input chosen such that the resulting half adder sum output is caused to arrive due to this remaining input no later than due to the input applied to said first half adder input;

e) apply the remaining next slowest arriving input to a first full adder input which provides the shortest delay to the full adder sum output, and apply to second and third full adder inputs particular ones of the remaining arriving inputs such that to the extent possible the resulting full adder sum output is caused to arrive due to each of these inputs no later than due to the input applied to said first full adder input; and f) repeat c) above for each remaining adder in said particular column at said particular level.

15. The combination of claim 12, 13 or 14, wherein an adder also produces an adder carry output, and wherein an adder sum output produced in a column at an adder level provides an input in the same column of the next level while an adder carry sum provides an input in the next more significant column of the next level.

16. The combination of claim 15, including final adder means for adding predetermined ones of said final set of column inputs to produce signals representing the bits of said product.

17. The combination of claim 16, wherein said final adder means comprises a serial adder for adding inputs in a first predetermined number of columns of said final set and a carry lookahead adder for adding inputs in a second predetermined number of columns of said final set.

18. The combination of claim 17, wherein said first predetermined number of columns are of less significance than said second predetermined number of columns, and wherein said serial adder produces an output carry which is applied as an input to said carry lookahead adder.

19. The combination of claim 18, wherein at least the least significant column of said final set contains a single input which is used as the least significant product bit without being applied to said serial adder.

20. The combination of claim 18, wherein said first predetermined number of columns is chosen to be approximately one-third of the total number of columns of said final set of inputs.

21. The combination of claim 18, wherein said first predetermined number of columns is chosen so that said output carry arrives at said carry lookahead adder at approximately the same time as the arrival of the inputs in the least significant column applied to said lookahead adder.

22. The combination of claim 18, wherein said serial adder comprises a plurality of half adder stages.

* * * * *